United States Patent
Mori et al.

(10) Patent No.: US 7,480,612 B2
(45) Date of Patent: Jan. 20, 2009

(54) WORD PREDICTING METHOD, VOICE RECOGNITION METHOD, AND VOICE RECOGNITION APPARATUS AND PROGRAM USING THE SAME METHODS

(75) Inventors: Shinsuke Mori, Kawasaki (JP); Masafumi Nishimura, Yokohama (JP); Nobuyasu Itoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 10/226,564

(22) Filed: Aug. 22, 2002

(65) Prior Publication Data

US 2003/0046073 A1  Mar. 6, 2003

(30) Foreign Application Priority Data

Aug. 24, 2001 (JP) .............................. 2001-254502

(51) Int. Cl.
*G06F 17/20* (2006.01)
*G10L 15/00* (2006.01)

(52) U.S. Cl. ................................ 704/9; 704/1; 704/257
(58) Field of Classification Search ................ 704/251, 704/255, 257, 231, 9, 1
See application file for complete search history.

(56) References Cited

U.S. PATENT DOCUMENTS 5,475,588 A * 12/1995 Schabes et al. ................ 704/9
5,878,385 A * 3/1999 Bralich et al. .................. 704/9
6,275,801 B1 * 8/2001 Novak et al. ................. 704/252
6,374,210 B1 * 4/2002 Chu ............................... 704/9
6,484,141 B1 * 11/2002 Tomoeda .................... 704/254
6,980,954 B1 * 12/2005 Zhao et al. .................. 704/251
7,020,587 B1 * 3/2006 Di et al. ......................... 704/9
7,024,351 B2 * 4/2006 Wang ............................. 704/9
7,359,852 B2 * 4/2008 Mori et al. ...................... 704/9

FOREIGN PATENT DOCUMENTS

JP    PUPA 09-134192    5/1997

OTHER PUBLICATIONS

Kneser, Reinhard. "Statistical Language Modeling Using a Variable Context Length." In ICSLP-96, vol. 1, pp. 494-497, 1996.*
Neukirchen et al. "Generation and Expansion of Word Graphs Using Long Span Context Information." Proc. IEEE International Conference on Acoustics, Speech, and Signal Processing, vol. 1, pp. 41-44, May 2001.*
Wu et al. "Combining Non-local Syntactic and N-gram Dependencies in Language Modeling," Proceedings of NLDB99, Klagenfurt, Austria, 1999.*

(Continued)

*Primary Examiner*—James S Wozniak
(74) *Attorney, Agent, or Firm*—Anne Vachon Dougherty

(57) ABSTRACT

A word predicting method for use with a voice recognition using a computer includes the steps of specifying a sentence structure of a history up to a word immediately before the word to be predicted, referring to a context tree stored in arboreal context tree storage section having information about possible structures of a sentence and a probability of appearance of words with respect to the structures at nodes, and predicting words based on the context tree and the specified sentence structure of the history.

6 Claims, 8 Drawing Sheets

OTHER PUBLICATIONS

Siu et al. "Variable n-gram and extensions for conversational speech language modeling". IEEE Transactions on Speech and Audio Processing, 2000, 8(1): pp. 63-75.*

Ciprian Chelba and Frederick Jelinek, Exploiting Syntactic Structure for Language Modeling, In Proceedings of the 17th International Conference on Computational Linguistics, pp. 225-231, 1998.

Shinsuke Mori, Masafumi Nishimura, Nobuyasu Itoh, Shiho Ogino, and Hideo Watanabe, A stochastic parser based on a structural word prediction model, In Proceedings of the 18th International Conference on Computational Linguistics, pp. 558-564, 2000.

"A Stochastic Parser Based on a Structural Word Dependency Model" IPSJ SIG Note, vol. 2000 No. 107 p. 143-150.

"Automatic Learning of Weighted Finite-State Transducer and Modeling of Pronunciation Variants" IEICE Papers D- II, vol. J83-D-11, No. 11 p. 2457-2464.

"Japanese Morphological Analyzer Using Context Tree" IPSJ SKT Notes, vol. 2000 No. 107 p. 31-36.

"Speech Recognition Utilizing Successor-Predictable Context" ASJ Papers-I-, p. 69-70.

"A Study on an Efficient Serach Strategy Using Phoneme History Aproximation and Delayed Bigraws", ASJ Papers-I-, p. 29-30.

"Design of Linguistic Postprocessor Using Variable Memory Length Markov Models" Proc. Of the Third Int. Conf. Document Analysis and Recognition, vol. 1, p. 454-457.

"Context Tree Parser for Arbori—Context Tree" NLP Papers p. 395-398.

"A Stochastic Language Model Using Dependency" IPSJ SIG Note vol. 97, No. 109 p. 35-42.

"Generation of a Composite Part- of —Speech and Automatically Derived Word Sequence N- Gram Model" IEICE Papers D-II, vol. J81-D-II, vol. J81-D-II No. 9 p. 1929-1936.

* cited by examiner

[Figure 1]
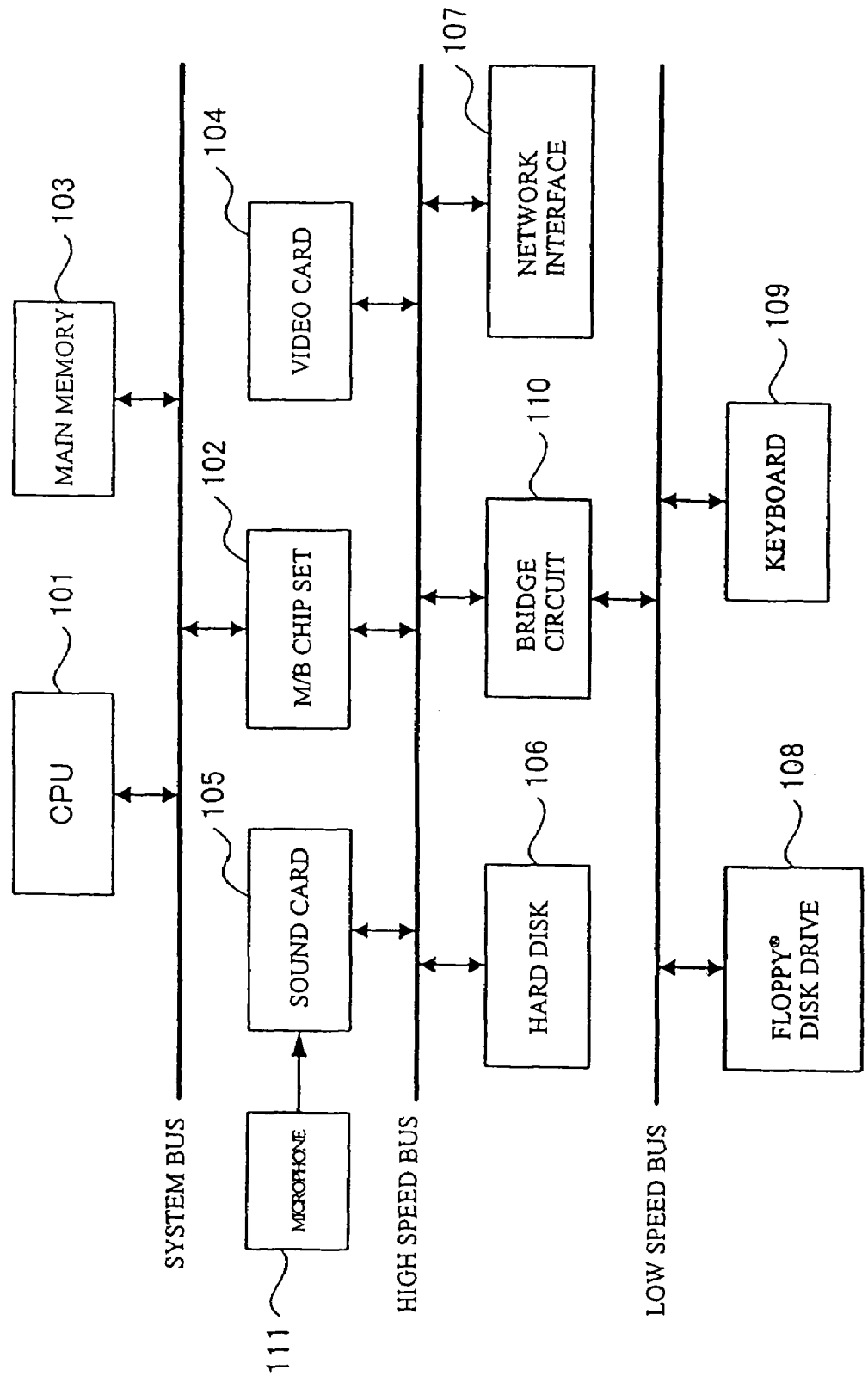

[Figure 2]
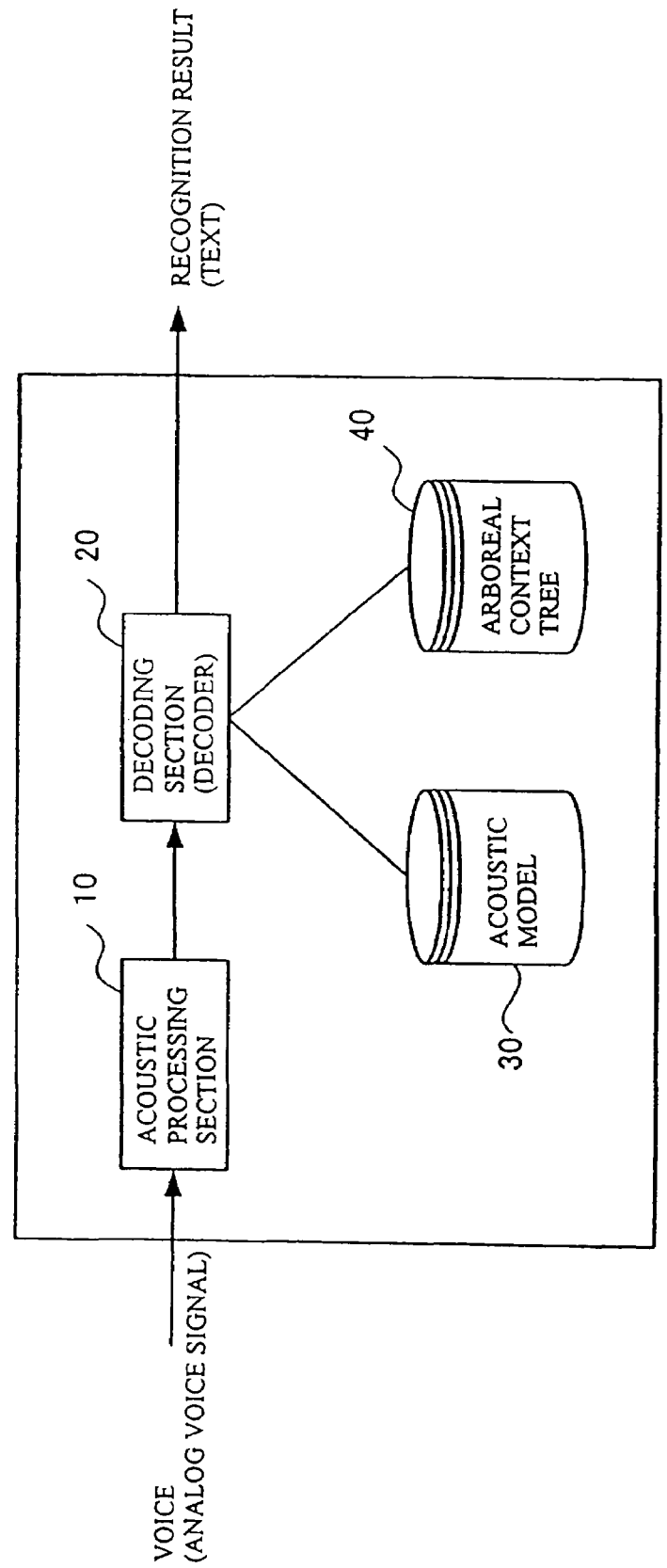

[Figure 3]
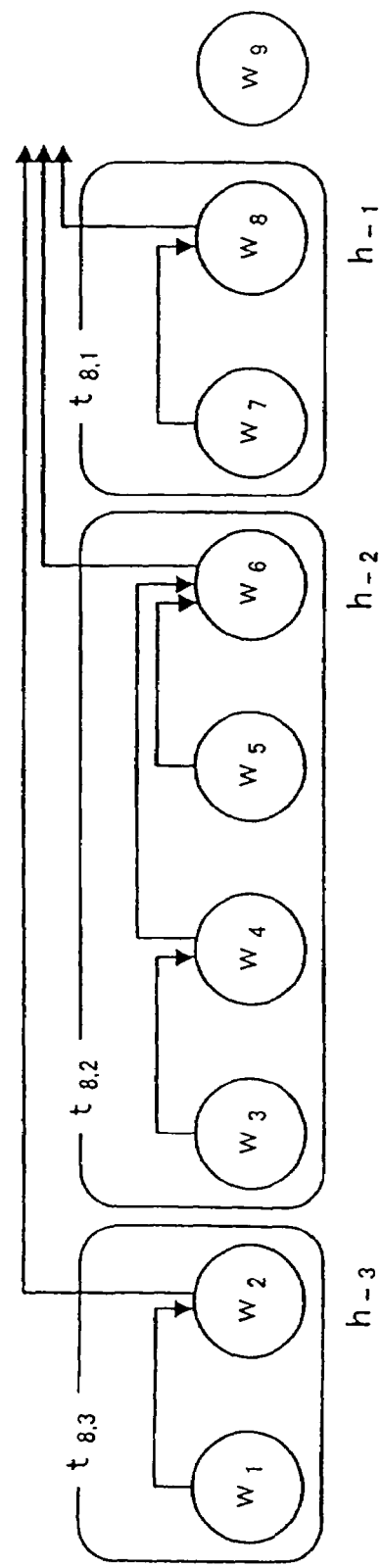

[Figure 4]
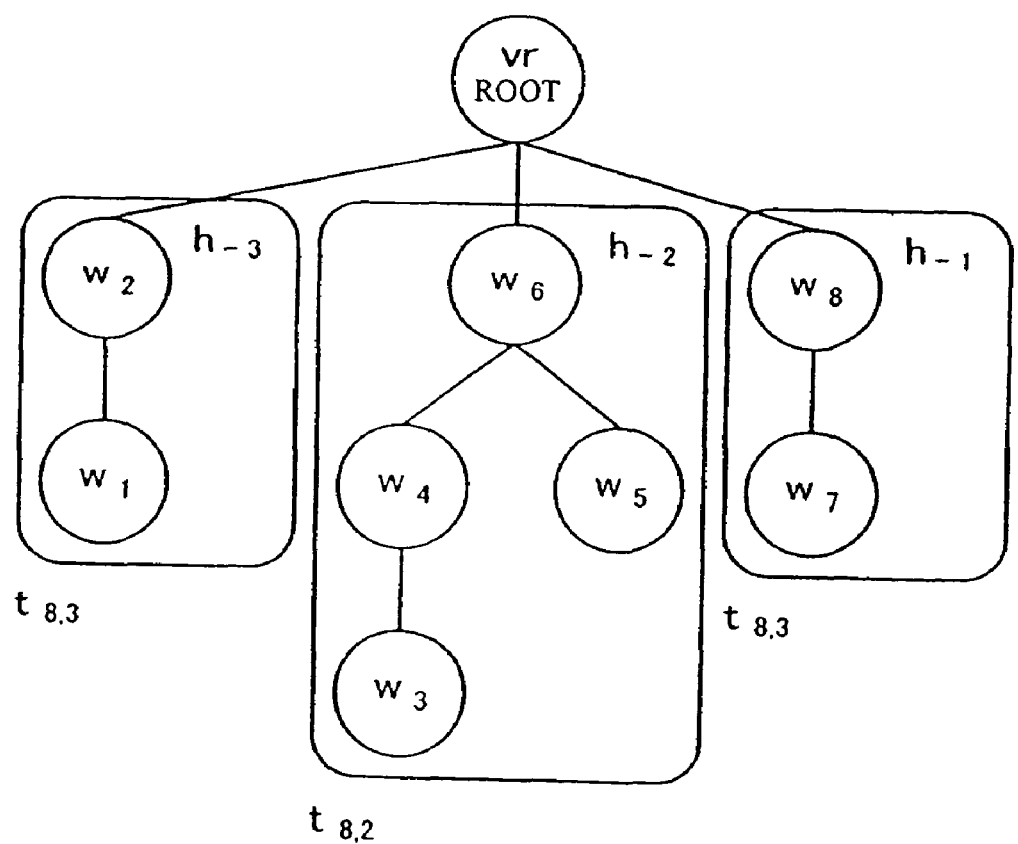

[Figure 5]
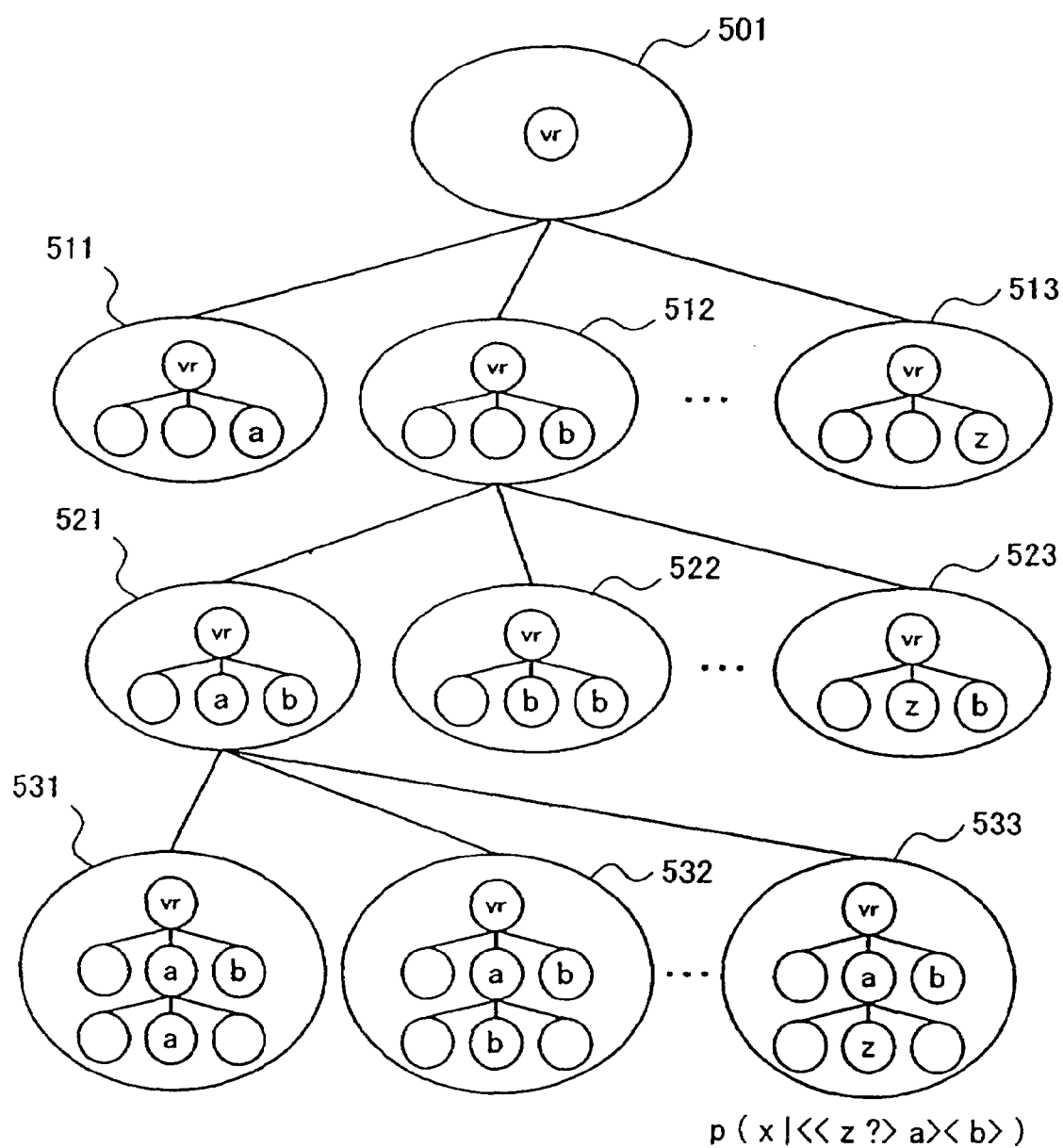

[Figure 6]
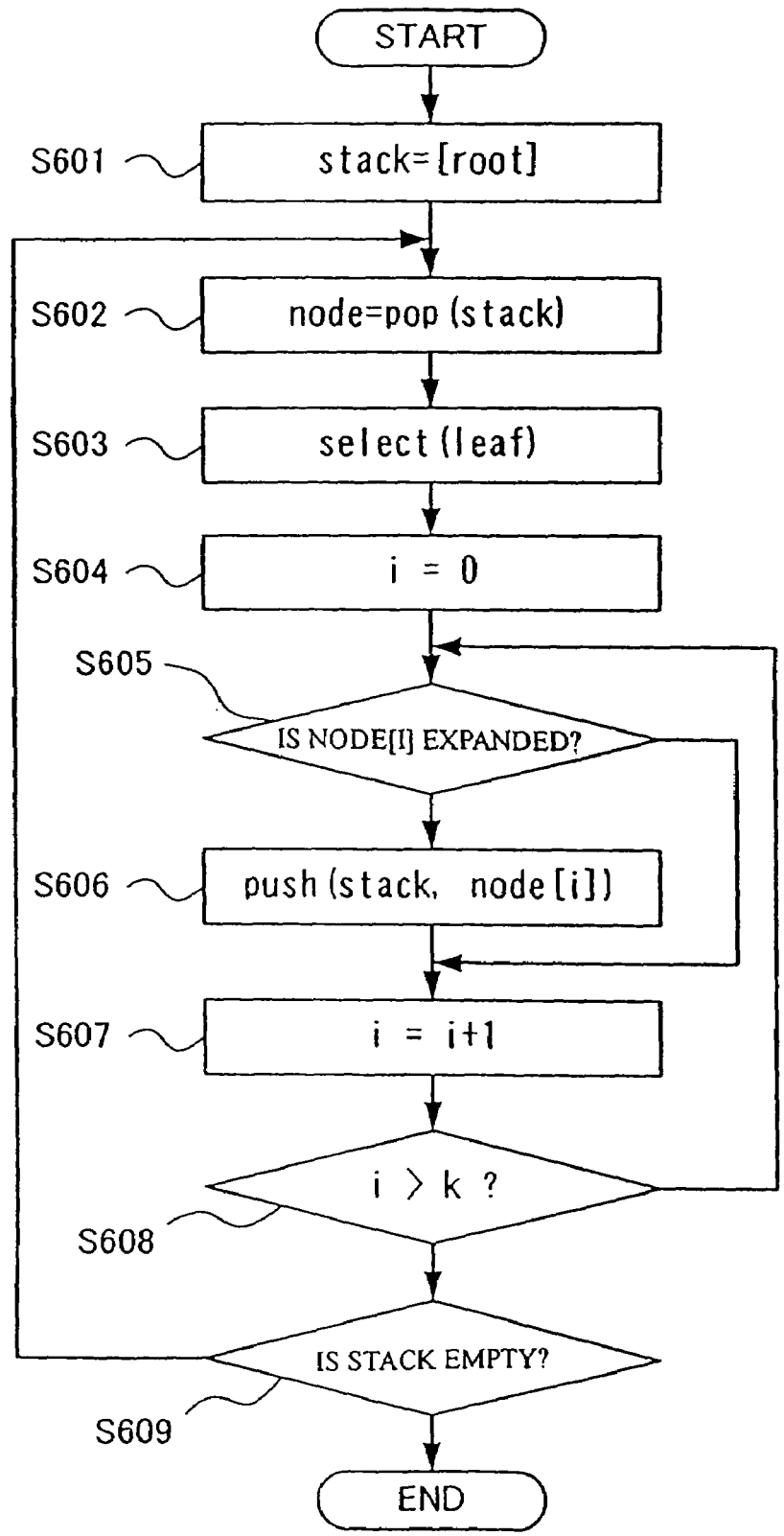

[Figure 7]
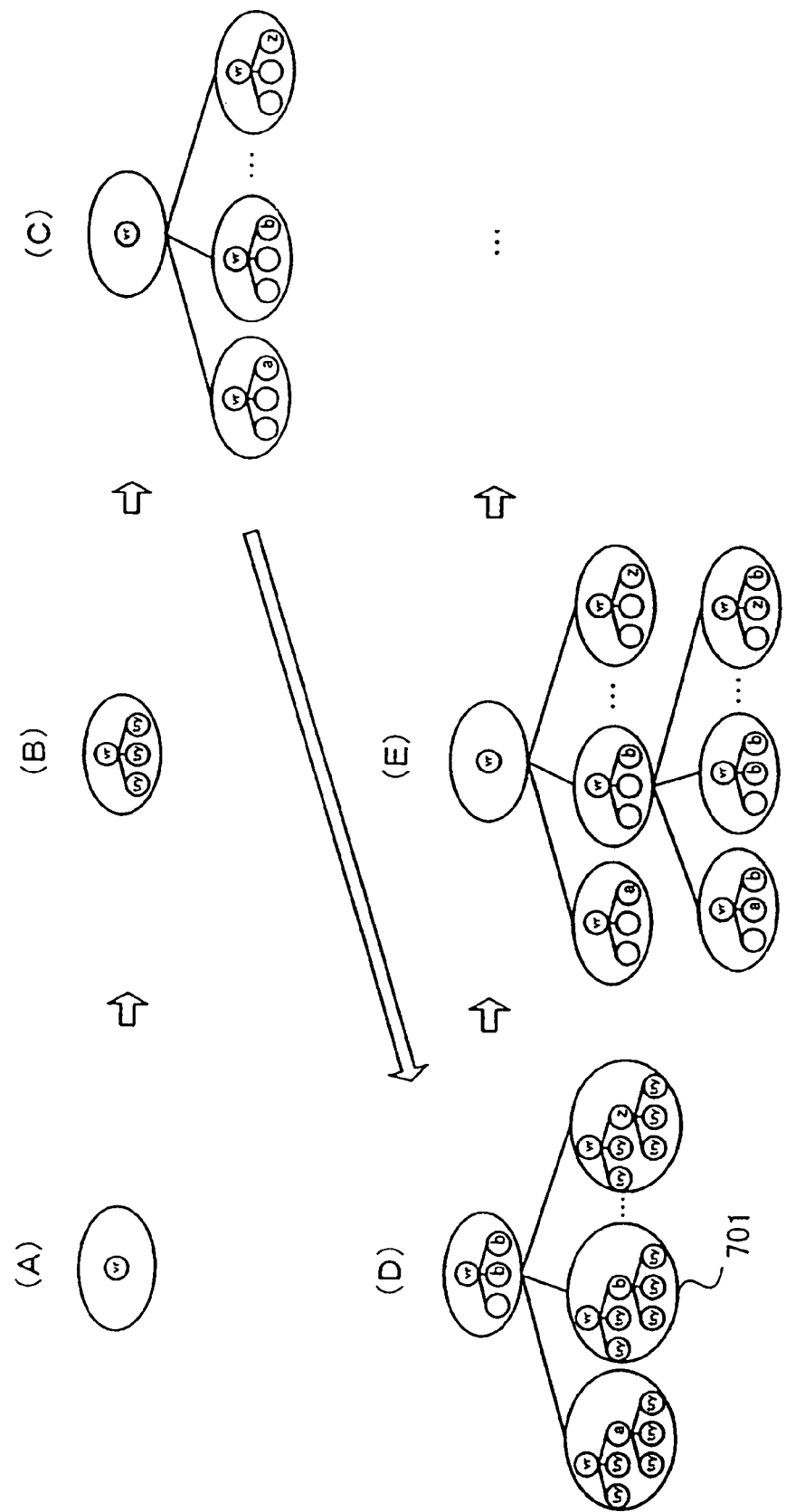

[Figure 8]

|  | NUMBER OF SENTENCES | NUMBER OF WORDS | NUMBER OF CHARACTERS |
|---|---|---|---|
| LEARNING | 7,677 | 218,628 | 336,726 |
| TEST | 853 | 24,268 | 37,552 |

[Figure 9]

| LANGUAGE MODEL | WORD PREDICTION | STRUCTURE PREDICTION | TOTAL (PRODUCT) |
|---|---|---|---|
| ARBOREAL CONTEXT TREE | 62.34 | 1.28 | 79.98 |
| RIGHTMOST TWO HEAD WORDS (CONVENTIONAL METHOD) | 79.17 | 1.28 | 101.56 |
| WORD 3-GRAM | 74.93 | ---- | 74.93 |

WORD PREDICTING METHOD, VOICE RECOGNITION METHOD, AND VOICE RECOGNITION APPARATUS AND PROGRAM USING THE SAME METHODS

BACKGROUND OF THE INVENTION

1. Field of the Invention

The present invention relates to a voice recognition method and a word prediction method of use with the voice recognition, and more particularly to a method of predicting words using a structural language model to make the voice recognition.

2. Brief Description of the Prior Art

In the voice recognition, a language model for controlling the linguistic information to make the word prediction or the like is employed. A typical statistical language model commonly used in these days is an n-gram model. The n-gram model predicts words successively from the top to the end of a sentence. And the probability of a sequence of n words is calculated (learned) beforehand, and the score (likelihood) of a composition actually spoken is calculated.

Accordingly, with the n-gram model, to predict a certain word, n−1 words prior to the word are referred to, whereby the word is statistically predicted. However, the value of n or the reference range is fixed irrespective of the words to be referred to.

On the contrary, a variable memory length Markov model is provided as the model making the reference range variable for a linear history. This is an extension of the n-gram model having the fixed reference range.

In this variable memory length Markov model, the reference history is selectively lengthened, only when the prediction precision is expected to be improved. For instance, in the variable memory length Markov model, when a preceding word directly before a word of prediction object is "this", the word before "this" is not distinguished, like the word 2-gram model, and when the preceding word directly before the word of prediction object is "of", the word before "of" is distinguished, like the word 3-gram model. Further, it is possible to distinguish directly preceding three words, like the 4-gram model, depending on the directly preceding two words.

Generally, when the n-gram model and the variable memory length Markov model requiring the same size of storage area are compared, the variable memory length Markov model has a higher prediction power. Also, when the n-gram model and the variable memory length Markov model that are estimated from the same learning corpus are compared, the variable memory length Markov model has a higher prediction power.

By the way, with a technique of voice speaking and its processing (voice language understanding), the estimation of syntactic structure is important, in addition to the word prediction made in the voice recognition. On one hand, in the n-gram model and the variable memory length Markov model, the sentence is regarded as the word string without structure. Thus, for the purpose of estimating the syntactic structure, some structural language models have been offered. The examples of structural language model are described in the documents as below.

Document 1: Ciprian Chelba and Frederick Jelinek, Exploiting Syntactic Structure for Language Modeling, In Proceedings of the 17th International Conference on Computational Linguistics, pages 225-231, 1998

Document 2: Shinsuke Mori, Masafumi Nishimura, Nobuyasu Itoh, Shiho Ogino, and Hideo Watanabe, A stochastic parser based on a structural word prediction model, In Proceedings of the 18th International Conference on Computational Linguistics, pages 558-564, 2000

In these structural language models, like the n-gram model, etc., the words are predicted in succession from the top to the end of a sentence. However, the sentence is not a simple word string, but represented as a tree having words at leaves. Accordingly, in predicting each word, the history to be referred to is not a word string, but is a partial parse tree covering words from the top of sentence up to the word directly before the word of prediction object.

In the above document 1, a method of predicting words from the history of tree structure has been disclosed in which the next word is predicted from the rightmost two head words in the history (Chelba & Jelinek model). Also, in the document 2, another method has been disclosed in which a word is predicted based on the words involving the word of prediction object and the relevant words.

SUMMARY OF THE INVENTION

With the above technique for voice speaking and its processing (spoken language understanding), the estimation of syntactic structure is important, whereby an effective structural language model is needed.

With the conventional structural language model as described above, the shape of partial parse tree to be referred to in predicting each word is fixed in either case. However, in some cases, it is more effective to refer to a larger part of the partial parse tree, but in other cases, it brings about an inverse effect from the data sparseness problem.

Accordingly, for the structural language model, like the variable memory length Markov model for the n-gram model, there is a need for selecting flexibly the shape of partial parse tree for reference (reference range), depending on the number of instances.

The language models for use with the voice recognition has been discussed, but there is a problem caused by the fact that the history of processing in the voice recognition is represented as an array having the tree structure. Accordingly, in the data string other than the language, there is generally a need for selecting flexibly the range of history to be used for prediction with a stochastic model useful in the process of predicting the next data element, based on the history having the tree structure.

In view of the problems identified in the prior art, the present invention provides a stochastic model in which the range of history to be used for prediction can be selected in the process of predicting the next data element based on the history having the tree structure. The present invention achieves word prediction and the estimation of syntactic structure with a high precision at the same time by using the stochastic model as a structural language model.

The present invention further provides a word predicting method of predicting words in a predetermined sentence by using a computer, the word predicting method comprising a step of acquiring a history to be used in predicting words from history storage means where a word prediction history is stored and specifying a sentence structure of the history, a step of acquiring a context tree for word prediction from context tree storage means, which stores the context tree having the information about possible structures of a sentence and a probability of appearance of words with respect to the structures at nodes, and a step of predicting a word to be predicted based on the specified sentence structure of the history and the acquired context tree for word prediction.

In this word predicting method, the history is a row of partial parse trees, and the possible structures of the sentence at nodes of the context tree consist of a tree structure, in which the word predicting method further comprises a step of predicting a word to be predicted by comparing a tree consisting of a virtual root having the row of partial parse trees directly under it added to the row of partial parse trees with the tree structure at the nodes of the context tree.

Also, the word predicting method further comprises a step of acquiring a context tree for sentence structure prediction from context tree storage means, which stores the context tree having the information about possible structures of the sentence and the probability of appearance of the sentence structure following the structures at nodes, and a step of predicting the sentence structure containing a predicted word, based on the predicted word, the sentence structure used in predicting the word, and the acquired context tree for sentence structure prediction, and storing the sentence structure in the history storage means.

Moreover, this invention is characterized by providing a word predicting method comprising a step of acquiring a history to be used in predicting words from history storage means where a word prediction history is stored and specifying a sentence structure of the history, a step of deciding an allowance range for predicting a word to be predicted in the sentence structure, based on the specified sentence structure of the history, and a step of predicting the word to be predicted, based on the sentence structure of the history in the decided allowance range.

Also, the word predicting method further comprises a step of deciding an allowance range in the sentence structure for predicting a new sentence structure containing the predicted words, based on the specified sentence structure of the history, and a step of predicting a new sentence structure containing the predicted words based on the sentence structure of the history in the decided allowance range and the predicted words, and storing it in the history storage means.

Further, this invention provides a voice recognition method of recognizing a voice signal as a word string by using a computer, the voice recognition method comprising a step of making an arithmetical operation on the voice signal to be processed, using an acoustic model and selecting a word as a recognition candidate resulted from the arithmetical operation, a step of specifying a sentence structure of a history up to the word immediately before the word to be predicted for the selected word as an object, and a step of predicting the word to be predicted based on a context tree having the information about possible structures of a sentence and a probability of appearance of words with respect to the structures at nodes and the sentence structure of the history.

Also, this invention is characterized by providing a voice recognition method comprising a step of making an arithmetical operation on the voice signal to be processed, using an acoustic model and selecting a word as a recognition candidate resulted from the arithmetical operation, a step of specifying a sentence structure of a history up to the word immediately before the word to be predicted for the selected word as an object, and a step of deciding an allowance range for predicting the word to be predicted in the sentence structure, based on the specified sentence structure of the history, and a step of predicting the word to be predicted based on the sentence structure of the history in the decided allowance range.

Further, this invention provides a data processing method comprising a step of acquiring a processing history of a tree structure to be used in predicting a predetermined element from history storage means storing the processing history for an array, a step of acquiring a stochastic model from stochastic model storage means storing the stochastic model for the tree structure having predetermined partial trees and a probability distribution associated with said partial trees at nodes, and a step of retrieving nodes corresponding to the tree structure of the processing history for the acquired stochastic model, and predicting the predetermined element as prediction object based on the probability distribution associated with the nodes.

This invention is also implemented as a voice recognition apparatus comprising an acoustic processing section for converting an analog voice signal into a digital voice signal, an acoustic model storage section for storing an acoustic model, a context tree storage section for storing a context tree having the information about possible structures of a sentence and a probability of appearance of words with respect to the structures at nodes, and a decoding section for recognizing the digital voice signal as a word string, using the acoustic model and the context tree, wherein the decoding section scans the context tree, based on the sentence structure of the history for word prediction, and predicts a word to be predicted, based on the probability of appearance at nodes corresponding to the sentence structure of the history.

Further, this invention is also implemented as the voice recognition apparatus, wherein the decoding section decides an allowance range in the sentence structure for predicting a word to be predicted, based on the sentence structure of a word prediction history, and predicts the word to be predicted, based on the sentence structure of the history in the allowance range.

Moreover, this invention is implemented as a program for making the word prediction method or the voice recognition method on a computer, or enabling the computer to operate as the voice recognition apparatus. This program may be stored and distributed in a magnetic disk, an optical disk, a semiconductor memory, or other recording medium, or distributed and provided over a network.

Further, this invention is implemented as a recording medium for storing the data making up a stochastic model, wherein the stochastic model has a tree structure, a root of the tree has a label of empty tree, and each node of the tree has a label of a partial tree in which the tree as label at a parent node is expanded at predetermined node, in which a probability distribution to be returned in scanning the stochastic model under the condition of the predetermined partial parse tree is appended to the node having the label of corresponding partial tree.

The label of each node in the stochastic model is the partial tree decided by applying a certain evaluation function to all the forms in which the tree as label at the parent node is expandable. Or the label of each node in the stochastic model is the partial tree expanded based on a comparison result that is obtained by making a comparison between the evaluation function when the tree as label at the parent node is expanded at each node and when not expanded.

The preferred embodiments of the present invention will be described below with reference to the attached drawings, and the scope will be appreciated by reference to the appended claims and their equivalents.

BRIEF DESCRIPTION OF THE DRAWINGS

FIG. 1 is a typical block diagram illustrating an example of the hardware configuration of a computer suitable for realizing a voice recognition system according to an embodiment of the present invention;

FIG. 2 is a diagram illustrating a configuration of the voice recognition system according to the embodiment of the invention that is realized with the computer as shown in FIG. 1;

FIG. 3 is a diagram showing a state immediately before predicting the ninth word in predicting words for a string of nine or more words;

FIG. 4 is a diagram showing a history tree for use in predicting the ninth word $w_9$ in the state of FIG. 3;

FIG. 5 is a diagram showing an example of an arboreal context tree according to this embodiment of the invention;

FIG. 6 is a flowchart for explaining a procedure for generating the arboreal context tree;

FIG. 7 is a view showing how the arboreal context tree grows by repeating the procedure of FIG. 6 recursively;

FIG. 8 is a table showing the dimensions of Japanese corpus for use in an example of word prediction; and FIG. 9 is a table showing a test set perplexity with each language model in the example of word prediction.

DETAILED DESCRIPTION OF THE INVENTION

A stochastic model as provided in this invention is typically employed for a process of predicting data elements in succession from the top of sentence in terms of a certain data string, based on a prediction history represented by a tree structure. In this embodiment, an example of predicting words in the voice recognition is presented below using the stochastic model as a structural language model in terms of the data string.

FIG. 1 is a typical block diagram illustrating an example of the hardware configuration of a computer suitable for realizing a voice recognition system according to this embodiment.

The computer 1 of FIG. 1 comprises a CPU (Central Processing Unit) 101, an M/B (Mother Board) chip set 102 and a main memory 103 which are connected via a system bus to the CPU 101, a video card 104, a sound card 105, a hard disk 106 and a network interface 107 which are connected via a high speed bus such as PCI bus to the M/B chip set 102, and a floppy disk drive 108 and a keyboard 109 which are connected to the M/B chip set 102 via a low speed bus such as a bridge circuit 110 and ISA bus from the high speed bus. Moreover, the sound card 105 is connected to a microphone 111 for input of the voice.

FIG. 1 only illustrates the configuration of the computer for implementing this embodiment, but other various system configurations may be taken in this embodiment. For example, instead of providing the sound card 105, sound means may be provided to implement a function of the M/B chip set 102.

FIG. 2 is a diagram illustrating the configuration of the voice recognition system according to the embodiment of the invention, which is realized by the computer as shown in FIG. 1.

Referring to FIG. 2, the voice recognition system of this embodiment comprises an acoustic processing section 10 for making the acoustic processing by inputting the voice, a decoding section (decoder) 20 for recognizing the input voice as a word string (text), using the processed result of the acoustic processing section 10, an acoustic model storage section 30 for storing an acoustic model, and an arboreal context tree storage section 40 for storing an arboreal context tree (Arbori-context tree), in which the acoustic model and the arboreal context tree are referred to by the decoding section 20.

The acoustic processing section 10 is realized by using the sound card 105 for the computer as shown in FIG. 1, in which the voice input from the microphone 111, namely, an analog voice signal is analyzed acoustically, and converted into a digital voice signal that is then stored in the main memory 103. This digital voice signal is hereinafter referred to as the voice signal.

The decoding section 20 is realized under the control of the CPU 101 by a program that is expanded in the main memory 103 as shown in FIG. 1, in which the voice signal obtained by the analysis of the acoustic processing section 10 is operated arithmetically using an acoustic model, and a word is selected as recognition candidate that is the arithmetical operation result. The selection of word using the acoustic model can be made by the general method that is conventionally well known. And the decoding section 20 predicts words in succession as the selected word as an object, while feeding back the processed result as the history, by a word prediction method as will be described later, and finally the voice recognition result is obtained. The obtained voice recognition result is displayed on a display unit via the video card 104 as shown in FIG. 1. Also, the recognition result may be printed by the printer, or stored in the hard disk 106 or other storage medium.

The program implements the function of the decoding section 20 under the control of the CPU 101, and is stored and distributed in a magnetic disk, an optical disk, a semiconductor memory, or other storage medium, or distributed over the network. In this embodiment, the program is input via the network interface 107, the floppy disk drive 108 or a CD-ROM drive, not shown, and stored in the hard disk 106. And the program stored in the hard disk 106 is read and expanded into the main memory 103, and executed by the CPU 101, thereby implementing the function of the decoding section 20.

The acoustic model storage section 30 is embodied in the hard disk 106 or the main memory 103 as shown in FIG. 1, in which an acoustic model for learning sound features in the voice are stored. The acoustic model is referred to in selecting a word as recognition candidate by the decoding section 20.

The arboreal context tree storage section 40 is implemented in the hard disk 106 or the main memory 104, as shown in FIG. 1, to store an arboreal context tree as the structural language model as offered in this invention.

In this embodiment, a tree having partial parse trees of the history of tree structure at labels is considered as the data structure of the stochastic model for use as the structural language model. Begin with the state of a root alone, this tree is grown recursively, whereby a context tree (arboreal context tree) having independent partial trees of history at the labels of leaves (nodes) is constructed. In addition to partial parse trees of history, the probability distribution (probability of appearance) under the conditions of the history is appended to the leaves.

In case of predicting words or sentence structure using the arboreal context tree obtained in this manner, the leaf having the label corresponding to the history is firstly obtained. And the prediction is made based on the probability distribution appended to the specific leaf.

Herein, an example of applying the structural language model to the relational grammar is cited to discuss the arboreal context tree.

In this structural language model, the word or sentence structure is predicted based on the partial parse trees covering the preceding word string. Accordingly, the partial parse tree T representing the sentence $W = w_1 w_2 \ldots w_n$ and its syntactic structure is calculated by the following numerical expression 1.

$$P(W, T) = \sum_{i=1}^{n} P(wi \mid ti-1)P(ti \mid wi, ti-1) \quad (1)$$

In Numerical expression 1, $t_i$ indicates the partial parse tree covering from the top of sentence to the i-th word.

FIG. 3 is a diagram showing a state immediately before predicting the ninth word in predicting words for a string of nine or more words and structure. This corresponds to the instance of i=9 in the Numerical expression 1.

In FIG. 3, first of all, the ninth word $w_9$ is predicted based on the partial parse tree $t_8=t_{8,3} t_{8,2} t_{8,1}$ covering words up to the eighth word $w_8$. Then, the partial parse tree $t_9$ covering words up to the ninth word $w_9$ is predicted based on the partial parse tree $t_8$ covering words up to the eighth word $w_8$ and the ninth word $w_9$. As a result, the state is immediately before predicting the tenth word. By repeating this processing, the word in the word string making up the input voice and its syntactic structure are decided.

Herein, it is problematical to classify the conditional parts in two conditional probabilities of the Numerical expression 1. If the classification is too coarse, the probability of appearance of word or sentence structure is obtained under fewer conditions, and more instances are included in the predetermined conditions, so that the discrimination capability is degraded. On one hand, if the classification is too fine, it is necessary to meet more conditions to specify the word or sentence structure, with fewer instances for judging the predetermined conditions, so that the estimation precision of probability value is decreased (data sparseness problem). In the Chelba & Jelinek model as described in the above document 1, the rightmost two head words, namely, $w_6$ and $w_8$, are employed invariably in the case of FIG. 3. However, in the case where word $w_2$ is involved in word $w_9$ as prediction object, depending on the sentence, or word $w_6$ is not involved in word $w_9$, the use of two head words is not always suitable to predict the next word $w_9$.

Thus, to allow the conditional parts of the conditional probabilities as described above to be selected flexibly, the history of word prediction in the structural language model is not the word string but the row of partial parse trees in this embodiment. By adding a virtual root having the partial parse tree of interest as the directly subordinate partial tree, one tree is supposed. The history of this tree structure is called a history tree. The above method of classifying the conditional parts in the conditional probabilities of the Numerical expression 1 corresponds to the problem of the history tree is considered to what extent to predict words.

FIG. 4 is a diagram showing the history tree for use in predicting the ninth word $w_9$ in the state of FIG. 3.

The method of flexibly classifying the history tree is represented by the data structure called an arboreal context tree. The label of each node (leaf) in the arboreal context tree is the partial tree including the root of history tree. The label of root is an empty tree. In the case where the predetermined node has a child node, the label of the child node is the tree for the label of parent node that is expanded at certain node.

FIG. 5 is a diagram showing an example of the arboreal context tree.

In the arboreal context tree as shown in FIG. 5, the labels of the child nodes 511 to 513 of a root 501 are obtained by appending or specializing the rightmost child node for the child nodes in the partial tree (empty tree) at the root label.

A method of predicting words using the arboreal context tree in the decoding section 20 will be described below.

A probability distribution P(x|t) is appended at each node of the arboreal context tree as shown in FIG. 5. Herein, x denotes an alphabetical symbol (representing the entire row of symbols arranged in a certain order, or a row of symbols for specifying an array of words in this embodiment, but the English alphabet is employed for the simplicity in the example of FIG. 5) and t denotes a label of node. For instance, if a tree consisting of a root having the label of $a_0$ and k nodes having the labels of $a_k, \ldots, a_2, a_1$ is denoted such as <$a_k \ldots a_2$ $a_1$>$a_0$, the probability distribution of alphabet x when the history is matched with the partial tree <<z?>a><b> is appended at a node 533 of the arboreal context tree as shown in FIG. 5. In other words, in case of predicting words from this node 533, the probability distribution of word is appended, where the rightmost head word of partial tree is b, the next rightmost head word is a, and the second rightmost root of the partial tree involving the head word a is z.

More specifically, in a case where a is equal to $w_6$, b is equal to $w_8$, and z is equal to $w_4$ in FIG. 3, the partial parse tree composed of $w_4$, $w_6$ and $w_8$ in the history tree as shown in FIG. 4 is employed to predict the ninth word $w_9$.

When predicting a certain word in the sentence as recognition object, the decoding section 20, first of all, acquires the history tree of word prediction covering words before the word of interest. This history tree is the prediction results up to the word of interest, and stored in a cache memory or the main memory 103 for the CPU 101 by the decoding section 20, as shown in FIG. 1.

Then, the decoding section 20 acquires the arboreal context tree from the arboreal context tree storage section 40, scans the arboreal context tree, based on the history tree, and retrieves the node having a partial tree matched with the history tree as the label. And the word of interest as prediction object is predicted, based on the probability distribution appended to the detected node, and the history tree containing the word of interest is predicted and stored as a newly processed history in the cache memory or the main memory 103 for the CPU 101.

In the above specific example, the decoding section 20 scans the arboreal context tree stored in the arboreal context tree storage section 40, detects the node of arboreal context tree with the partial tree having the nodes corresponding to $w_4$, $w_6$ and $w_8$ as the label, and predicts the ninth word $w_9$, based on the probability distribution appended to the node. This example is involved in the specialized prediction from the rightmost two head words ($w_6$ and $w_8$). More generally, the model on the basis of the arboreal context tree contains the model on the basis of the rightmost two head words as its special instance.

The decoding section 20 performs the above processing successively from the first word in the sentence to the last word, and outputs the predicted word string as the result of voice recognition when the end of sentence is reached. Thereby, the word string having the highest probability of appearance that is obtained by the probability distribution based on the structure of history tree is acquired as the result of voice recognition.

In this manner, since the arboreal context tree has the partial tree corresponding to the history tree of word prediction at the label of node, the tree structure corresponding to the history tree can be followed in the range where the arboreal context tree is generated by scanning the arboreal context tree. And the probability of appearance of the next word having the corresponding tree structure as the history tree is acquired by the probability distribution appended to the node having the corresponding tree structure at the label.

A way of growing the arboreal context tree, or expanding the partial tree as the label of node can be decided by applying an evaluation function to all the expandable forms to give the probability distribution as will be described later. For instance, when the evaluation function exceeds a certain threshold value due to the high frequency of appearance, the probability distribution can be given by growing the arboreal context tree to expand the node.

Accordingly, when the arboreal context tree is employed in the structural language model in the word prediction, it is possible to specify to what depth (extent) the history tree is taken into consideration to predict the next word based on the structure itself of the history tree. That is, it is possible to flexibly select the range of history tree to be taken into consideration to predict words based on the structure of arboreal context tree.

By the way, in the word prediction using the structural language model, the history of word prediction is the row of partial parse trees. After the i-th word is predicted employing the history tree made up of the partial parse trees and the arboreal context tree, the history tree including words up to the i-th word is created employing the history tree up to the (i−1)-th word and the i-th word, and used to predict the (i+1)-th word. Thus, to create the history tree including words up to the i-th word, the prediction using this arboreal context tree is performed.

That is, apart from the arboreal context tree (as the structural language model) for the word prediction, the arboreal context tree having the probability distribution for the probability of appearance of the partial parse tree as sentence structure containing the next word given to the node is prepared, based on the structure of history tree. And the decoding section 20 predicts the history tree containing the i-th word, employing the arboreal context tree for syntactic prediction, based on the i-th word, this history tree being employed to predict the (i+1)-th word.

Thereby, in predicting the history tree, it is possible to flexibly select the range of history tree to be taken into consideration for the prediction, whereby the more excellent prediction result can be expected than conventionally.

A method of generating the arboreal context tree as the structural language model employed in this embodiment will be described below.

FIG. 6 is a flowchart for explaining a procedure for generating the arboreal context tree. Also, FIG. 7 is a view showing how the arboreal context tree grows by repeating the procedure of FIG. 6 recursively.

The arboreal context tree may be generated as the preprocessing of voice recognition in the computer (FIG. 1) for realizing the voice recognition system of FIG. 2, or may be generated using another computer and passed to the computer for realizing the voice recognition system. In this description, the arboreal context tree is generated in the computer as shown in FIG. 1.

In an initial state, the arboreal context tree consists of the root alone having the history tree composed of virtual node as the label. Thus, first of all, the arboreal context tree consisting of the root alone is prepared as shown in FIG. 7A, and put into a stack in the cache memory of the CPU 101 as shown in FIG. 1 (step 601: stack=[root]).

The node is recursively added to this arboreal context tree as shown in FIG. 7.

First of all, the last element stored in the stack is taken out, and substituted into the node of arboreal context tree (step 602: node=pop(stack)). In the case where the arboreal context tree consisting of the root alone that is put into the stack initially at step 601 is considered, the child nodes of the root are added as shown in FIG. 7C. A criterion as to which node is added or whether or not the node is added is an evaluation function based on the perplexity of held-out corpus.

Then, the best expansion of node (leaf) is selected, and the child nodes generated thereby are assumed as node[0], node [1], . . . , node[k] (step 603: select(leaf)). This selection of node expansion is made by calculating a difference of the evaluation function by expanding a given node for each of all possible expansions. For example, when the argument is a leaf 701 in the tree as shown in FIG. 7D, five expansions are possible as shown below.

1) Specialization of root for the second partial parse tree
2) Specialization of root for the third partial parse tree
3) Specialization of the first child node for the first partial parse tree
4) Specialization of the second child node for the first partial parse tree
5) Specialization of the third child node for the first partial parse tree Herein, it is assumed that the maximum number of words regarding one word is 3. In an example as shown in FIG. 7E, the "1) specialization of root for the second partial parse tree" is selected.

The evaluation function used to select the node expansion method can be appropriately decided depending on the prediction object (word or natural language to be recognized from the voice in this case).

Then, i is set to 0 (step 604), and it is determined whether or not node[i] is expanded (step 605). In this case, a difference in the evaluation function between expansion and unexpansion for each alphabet (symbol for specifying an array of words as the object) is calculated, and it is determined whether or not the expansion is effective. And the node is expanded only for the alphabet that is determined that the expansion is effective, and node[i] is put into the stack (stack 606: push(stack, node[i])).

This node expansion process (expand(leaf, select(leaf)) is performed successively from i=0 to i=k (steps 607, 608).

Thereafter, if the stack is not empty, namely, there is any node newly generated by expanding the node, the procedure returns to step 602 to repeat the above process. On the other hand, if the stack is empty, namely, there is no leaf newly generated by expanding the node, the process is ended (step 609).

The arboreal context tree generated in the above way is stored in the arboreal context tree storage section 40 provided by the hard disk 106, and employed for the voice recognition process made by the decoding section 20.

While the configuration of the model and the method of word prediction have been described above using the arboreal context tree as the structural language model, the use of the stochastic model represented as the arboreal context tree is not limited to the word prediction as the structural language model. That is, the stochastic model is generally employed for the prediction process in which the data elements are predicted successively from the top of a certain data string, and the history of prediction represented as the tree structure is fed back in predicting predetermined data elements. In this case, each node of the arboreal context tree that is the stochastic model has the possible tree structure of the prediction history in the prediction process as the label. Also, the probability distribution associated with the tree structure that is the label of node is appended to each node. And the probability distribution appended to the node having the label corresponding to the tree structure can be obtained by scanning the stochastic model under the conditions of predetermined tree structure.

EXAMPLE

Using the Japanese corpus with a relation afforded, a comparison was made between the word prediction using the structural language model based on the arboreal context tree and the word prediction using the structural language model referring to the fixed history to assess the precision.

The Japanese corpus employed in the experiment was a sentence contained in the article written in the Nihon Keizai Shimbun. Each sentence is divided into words and is given a relational structure. The Japanese corpus is divided into ten regions, in which the language model parameters are estimated from nine of ten regions, and the remaining one region is tested. In the language model parameters, when it is required to simulate a test corpus, like the estimation of interpolation coefficients, a similar method of deletion and interpolation is employed with the nine learning regions of corpus. Also, the dimensions of Japanese corpus are listed in a table as shown in FIG. 8.

To assess the prediction power of the structural language model based on the arboreal context tree in comparison with the structural language model based on two head words, these language models were created from the same learning corpus, and the perplexity for the same test corpus was calculated. In this calculation, the structure attached to the test corpus was employed. Accordingly, the generation probability of each sentence in the test corpus is not the sum of generation probabilities over all the possible generation methods. Since a portion of structure prediction in each language model is common, contribution of this portion to the perplexity is constant.

Also, an unknown word is replaced with a symbol indicating the part of speech, and the perplexity caused by generating the character string of unknown words is exceptional.

FIG. 9 is a table showing a test set perplexity with each language model. The perplexity is the number of branches when a uniform distribution is assumed, and a low perplexity means that the prediction power of word or structure is correct.

The test set perplexity of structural language model based on the arboreal context tree is quite lower than the test set perplexity of structural language model based on the rightmost two head words, and decreased by 21.25%.

The arboreal context tree can be employed for the prediction of sentence structure, which begins with the fixed history in any structural language model for comparison. Accordingly, since a part of structure prediction is common, the total perplexity is decreased by 21.25%. This result means to succeed in improving the structural language model based on the rightmost two head words as the existing technique by using the arboreal context tree.

In the voice recognition using the structural language model based on the arboreal context tree, the more excellent word prediction power is also exhibited for the conventional word 3-gram model as shown in FIG. 9. Accordingly, the language model of voice recognition system from the conventional model based on the word string (e.g., word 3-gram model) is replaced with the structural language model based on the arboreal context tree, whereby the recognition precision can be improved.

Further, in the voice recognition using the structural language model based on the arboreal context tree, the words and the syntactic structure of sentence for use in predicting words are predicted. Accordingly, it is possible to output the recognition result with the syntactic structure appended. If the syntactic structure is appended to the recognition result, precise process can be effected in view of the syntactic structure in making the post-processing (e.g., sentence retrieval) using the recognition result.

Hence, the structural language model based on the arboreal context tree becomes the very effective language mode from the viewpoint of voice language understandings.

As described above, with the present invention, the range of history for use with the prediction is selectively used in predicting the next data element based on the history of tree structure, thereby enhancing the prediction power.

Also, with the invention, the word prediction and the estimation of syntactic structure can be implemented at high precision by using the stochastic model as the structural language model.

The present invention can be implemented in hardware, software, or a combination of hardware and software. The present invention contemplates a computer program storage media tangibly embodying a program of instructions to carry out any one, some, or all of the method steps described herein.

DESCRIPTION Of SYMBOLS

10 . . . acoustic processing section
20 . . . decoding section (decoder)
30 . . . acoustic model storage section
40 . . . arboreal context tree storage section
101 . . . CPU (Central Processing Unit)
102 . . . M/B (Mother Board) chip set
103 . . . main memory
104 . . . video card
105 . . . sound card
106 . . . hard disk
111 . . . microphone

What is claimed is:

1. A word predicting method of predicting words in a predetermined sentence by using a computer, comprising the steps of:
   retrieving a history tree of word prediction covering words before a word to be predicted to be used in predicting words from a word prediction history storage means where a word prediction history of partial parse trees is stored;
   dynamically selecting a shape of a partial parse tree as a word prediction reference range by specifying a sentence structure of said history;
   acquiring an arboreal context tree for word prediction from a context tree storage means, which stores said context tree having information about possible structures of a sentence and a probability of appearance of words with respect to said structures at nodes;
   comparing at least one node of said arboreal context tree to said history tree;
   identifying a node of said arboreal context tree having a partial tree matched with said history tree;
   using a probability distribution appended to the identified node of the arboreal context tree to predict a word to be predicted; and
   outputting the predicted word.

2. The word predicting method according to claim 1, wherein said history is a row of partial parse trees, and the possible structures of the sentence at nodes of said context tree comprise a tree structure, and said word predicting method further comprises a step of predicting a word to be predicted by comparing a tree consisting of a virtual root having said row of partial parse trees directly under it added to said row of partial parse trees with said tree structure at the nodes of said context tree.

3. The word predicting method according to claim 1, further comprising the step of:
acquiring a context tree for sentence structure prediction from said context tree storage unit, which stores the context tree having the information about possible structures of the sentence and the probability of appearance of the sentence structure following said structures at nodes; and
predicting the sentence structure containing a predicted word, based on said predicted word, said sentence structure used in predicting said word, and said acquired context tree for sentence structure prediction, and storing said sentence structure in said history storage unit.

4. A data processing method comprising the steps of:
retrieving a processing history tree of word prediction covering words before a word to be predicted to be used in predicting a predetermined element from a word prediction history storage unit storing said processing history of partial parse trees for an array;
dynamically selecting a range of processing history for use as a word prediction reference range by acquiring a stochastic model from a stochastic model storage unit storing the stochastic model for the tree structure having predetermined partial trees and a probability distribution associated with said partial trees at nodes;
comparing at least one node of said stochastic model to said history tree to identify a node of said stochastic model having a partial tree corresponding to the tree structure of said processing history for said stochastic model,
using a probability distribution appended to the identified node of the stochastic model to predict said predetermined element; and
outputting the predicted element.

5. A computer-readable program storage medium readable by computer and tangibly embodying a program of instructions stored on the medium and executable by the machine for causing the computer to perform a method for predicting words in a predetermined sentence by controlling a computer,
wherein said method comprises the steps of:
retrieving a history tree of word prediction covering words before a word to be predicted to be used in predicting words from a word prediction history storage means where a word prediction history of partial parse trees is stored;
dynamically selecting a shape of a partial parse tree as a word prediction reference range by specifying a sentence structure of said history;
acquiring an arboreal context tree for word prediction from a context tree storage means, which stores said context tree having information about possible structures of a sentence and a probability of appearance of words with respect to said structures at nodes;
comparing at least one node of said arboreal context tree to said history tree;
identifying a node of said arboreal context tree having a partial tree matched with said history tree;
using a probability distribution appended to the identified node of the arboreal context tree to predict a word to be predicted; and
outputting the predicted word.

6. A computer-readable program storage medium readable by computer and tangibly embodying a program of instructions stored on the medium and executable by the machine for causing the computer,
wherein said method comprises the steps of:
retrieving a processing history tree of word prediction covering words before a word to be predicted to be used in predicting a predetermined element from a word prediction history storage unit storing said processing history of partial parse trees for an array;
dynamically selecting a range of processing history for use as a word prediction reference range by acquiring a stochastic model from a stochastic model storage unit storing the stochastic model for the tree structure having predetermined partial trees and a probability distribution associated with said partial trees at nodes;
comparing at least one node of said stochastic model to said history tree to identify a node of said stochastic model having a partial tree corresponding to the tree structure of said processing history for said stochastic model,
using a probability distribution appended to the identified node of the stochastic model to predict said predetermined element; and
outputting the predicted element.

* * * * *